United States Patent
Zhengdi

(10) Patent No.: US 7,218,939 B2
(45) Date of Patent: May 15, 2007

(54) ESTIMATION OF A SIGNAL DELAY

(75) Inventor: Qin Zhengdi, Tampere (FI)

(73) Assignee: Nokia Corporation, Espoo (FI)

( * ) Notice: Subject to any disclaimer, the term of this patent is extended or adjusted under 35 U.S.C. 154(b) by 168 days.

(21) Appl. No.: 10/727,113

(22) Filed: Dec. 2, 2003

(65) Prior Publication Data
US 2005/0059411 A1    Mar. 17, 2005

(30) Foreign Application Priority Data
Dec. 2, 2002    (WO) ............... PCT/IB02/05055

(51) Int. Cl.
*H04Q 7/20*    (2006.01)
*H04B 17/00*    (2006.01)

(52) U.S. Cl. ............... 455/456.1; 455/456.6; 455/446; 455/67.16

(58) Field of Classification Search ........... 455/456.1, 455/67.16, 456.6, 446
See application file for complete search history.

(56) References Cited

U.S. PATENT DOCUMENTS 6,549,545 B1 *    4/2003    Yamamoto et al. ......... 370/508
6,748,224 B1 *    6/2004    Chen et al. ............... 455/456.1
6,760,599 B1 *    7/2004    Uhlik ........................ 455/525
6,775,252 B1 *    8/2004    Bayley ...................... 370/328
7,065,369 B2 *    6/2006    Tang et al. ............... 455/456.1
2001/0051527 A1 *    12/2001    Kuwahara et al. .......... 455/456
2003/0114172 A1 *    6/2003    Soliman .................... 455/456
2003/0134652 A1 *    7/2003    Ben-Eli .................... 455/515
2003/0176189 A1 *    9/2003    Merson et al. ............. 455/436

FOREIGN PATENT DOCUMENTS

EP    1 164 383 A2    12/2001
WO    WO 01/25813 A1    4/2001
WO    WO 03/009613 A1    1/2003

* cited by examiner

*Primary Examiner*—Lester G. Kincaid
*Assistant Examiner*—Marisol Figueroa

(57) ABSTRACT

The invention relates to a method for estimating a delay of a signal received at a mobile station MS from a specific network element $BS_1$, $BS_2$ of a network for determining the location of the mobile station. In order to reduce the false alarm ratio and to increase the acquisition probability, it is proposed that the method comprises estimating the delay within a search window. The search window is determined based on location information available for the specific network element $BS_1$, $BS_2$ and on a known distance of the mobile station MS to at least one other network element $BS_0$, $BS_1$. The invention relates equally to a corresponding mobile station MS, to a corresponding network element $BS_0$, and to a communication system comprising at least one mobile station and at least two network elements.

9 Claims, 9 Drawing Sheets

ESTIMATION OF A SIGNAL DELAY

CROSS REFERENCE TO RELATED APPLICATIONS

This application claims priority under 35 USC §119 to International Patent Application No. PCT/IB02/05055 filed on Dec. 2, 2002.

FIELD OF THE INVENTION

The invention relates to a method for estimating a delay of signals received at a mobile station from a specific network element of a network for determining the location of the mobile station. The invention relates equally to a mobile station, to a network element of a network and to a communication system.

BACKGROUND OF THE INVENTION

The location of a mobile station can be determined by a positioning procedure, for example a positioning procedure which is part of a location service.

Location services in cellular systems are based on determining the delay of signals transmitted by different network elements of a cellular network to a mobile station of which the location is to be determined. In case of a line-of-sight transmission, the delay of the signals is directly dependent on the distance between the mobile station and the respective transmitting network element.

A location service puts other demands on the acquisition of signals than usual communication services, and in particular on the finger searching process (a process known for RAKE type receivers) for the delay estimation using information of an impulse response.

For usual communication services, the strongest signals are of the highest interest. The searching can therefore be carried out by picking up the peaks in the impulse responses. For location services, in contrast, it is an aim to find the signal which arrives first, preferably the line of sight signal, if available.

For usual communication services, further the covering range is different, since only the signals from the serving network element have to be acquired. The serving network element is the network element serving the cell in which the mobile terminal is currently located. Thus for usual communication services, the delay profile is mainly determined by the cell size of the network. For location services, in contrast, the covering range is determined by the size of the server cell and the neighboring cells, since signals from a plurality of network elements are required for determining the exact position of the mobile station.

For illustration, FIG. 1 shows a cellular network with a server base station $BS_s$ as serving network element in a server cell 10 having a hexagonal shape. The mobile station MS, of which the current location is to be determined, is situated in this server cell 10. The server cell 10 is surrounded by six further hexagonal cells 11, which are served by immediately neighboring base stations $BS_n$ constituting further network elements. Additional base stations, which are still farther away from the mobile station MS, might have to be taken into account in addition.

The searching procedure for detecting a delayed signal for a location service is normally carried out in the impulse response of signals received from different network elements. The searching may be performed with a correlation procedure, e.g. with a matched filter, starting from a zero delay. The delay is then increased until a correspondence is found. The delay can be estimated e.g. by an edge detection in the impulse response profile of the received signals. The length of the impulse response profile is much longer than the width of the signal shape. Therefore, the search for an edge is started from a certain position of the signal by comparing the amplitude of sampling data with a predefined threshold. On the one hand, this threshold has to be set high enough in order to avoid that a noise peak is detected as the signal edge, which would result in a false alarm. On the other hand, the threshold has to be set low enough to guarantee that the signal edge is detected even if the signal strength is rather weak.

Principally, the length of the impulse response should be long enough to cover the possible maximum delay. It is known from the searching procedures for delayed signals, however, that the length of the searching range generally affects the false-alarm rate in the acquisition of a signal. The longer the searching range, the higher the false alarm rate will be. The problem is even more severe for location services, since the signals are partly much weaker and the noise is higher for neighboring network elements, while the delays are bigger. The majority of the noise is the interference caused by the server network element when acquiring the neighboring network element.

The same kind of problems may occur in other cellular network based positioning procedures.

SUMMARY OF THE INVENTION

It is an object of the invention to reduce the false alarm rate and to obtain a high acquisition probability when determining the location of a mobile station.

This object is reached according to the invention with a method for estimating a delay of a signal received at a mobile station from a specific network element of a network for determining the location of the mobile station. It is proposed that the method comprises estimating the delay within a search window. The search window is determined based on location information available for the specific network element and on a known distance of the mobile station to at least one other network element. The estimated delay of signals from the specific network element corresponds to the distance to this specific network element.

The object of the invention is further reached with a corresponding mobile station comprising means for receiving signals from a plurality of network elements of a network for determining the location of the mobile station and means for determining a delay of received signals using a respective search window. The mobile station moreover comprises either means for receiving an indication of a search window for each of the network elements or means for determining the search window itself according to the proposed method.

The object of the invention is equally reached with a corresponding network element for a network comprising means for transmitting signals for determining the location of a mobile station to this mobile station. The network element comprises in addition either means for determining a search window for at least one further network element of the network according to the proposed method, and means for transmitting information on the determined search window to the mobile station. Or the network element comprises in addition means for retrieving and transmitting location information about at least one further network element to the mobile station. The network unit can be for example a base station of a radio access network.

Finally, the object of the invention is reached with a communication system comprising at least two network elements for transmitting signals for determining the location of a mobile station, at least one mobile station with means for determining a delay of received signals based on a search window, and means for determining a search window according to the proposed method. The latter means may be comprised either in a mobile station or in a network element.

The invention proceeds from the idea that in order to reduce the false-alarm rate in the acquisition, the searching range can be limited by placing a search window in the impulse response profile. When the distance to at least one network element is known and further geometric information for a specific network element to which the distance is to be determined is available, the search window can be restricted based on this information. The geometric information can be either the exact position of the specific network element or information about the position relative to a known location. The available information allows in particular to determine a minimum and maximum distance the mobile station may have to the specific network unit, and thereby a possible minimum and maximum delay of signals transmitted by this specific network unit. The search window can thus be selected such that it enables a search of signals arriving with a delay between this minimum and maximum delay.

It is an advantage of the invention that it reduces the false alarm rate and increases the acquisition probability when determining the location of a mobile station, e.g. in a location service. In addition, the amount of noise components is reduced, e.g. to one half.

The invention moreover enables an acquisition of weaker signals, and thus of more network elements. This leads also to a more accurate positioning.

It is further an advantage of the invention that with a reduction of the searching range, the operations in the matched filter and the search operations are faster compared to known solutions. Compared to a searching range used in conventional signal acquisition procedures for location services, the searching range can be reduced e.g. by 50% by using the proposed search window.

Preferred embodiments of the invention become apparent from the dependent claims.

In a particularly simple embodiment of the invention, a single known distance of the mobile station to one other network element can be used for determining the search windows for one or more specific network elements. For example, the known distance can be given by the maximum distance of a boarder of the cell in which the mobile station is currently located to the network element serving this cell. The search window for all specific network elements may thus have a length corresponding to the double of this maximum distance. The search window then only has to be shifted for each specific network element according to its relative position.

Advantageously, however, a more detailed knowledge on available distances is used. When the serving network element has been acquired, the known distance may be a determined distance of the mobile station to the serving network element. When the distances to at least two other network elements were estimated already, the distances to all of these network elements may be taken into account for determining the search window. The search window can be selected in particular such that it covers intersection points of all circles around the acquired network elements with a radius of the respectively determined distance. In order to enable a particularly small search window, the search window can be subdivided into at least two sub-windows, each covering a respective intersection point.

In order to ensure the reliability in the second approach, the delay of signals from nearer network elements or from those providing stronger signals are preferably determined first. When basing the estimation of a parameter value of a second object on the estimation of a parameter value obtained for a first object, and the parameter value for the first object is not reliable, the method is not convergent. In the proposed method, the most reliable object should be the serving network element and then the respective nearest network element or the network element providing the strongest signals.

In a further preferred embodiment of the invention, the covering range of the specific network element and the power level employed by the specific network element for transmitting signals is take into account in addition for determining the search window.

Advantageously, the search window is not only used for limiting the search range for the delay of a received signal, but also for setting a threshold value for the signal strength of received signals. The smaller the search window, the lower the threshold value may be for obtaining the same false alarm ratio and the same acquisition probability.

The invention can be employed with any kind of network which transmits signals via the air interface, for instance a cellular network, a radio station network, etc. Correspondingly, the invention can be employed in any cellular system, e.g. in a GSM (global system for mobile communications), a CDMA (code division multiple access) and/or a GPRS (general packet radio system) system, but equally in any system using a non-cellular network. Further, it can be used with any kind of positioning, e.g. with a service using OTD (Observed Time Difference).

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
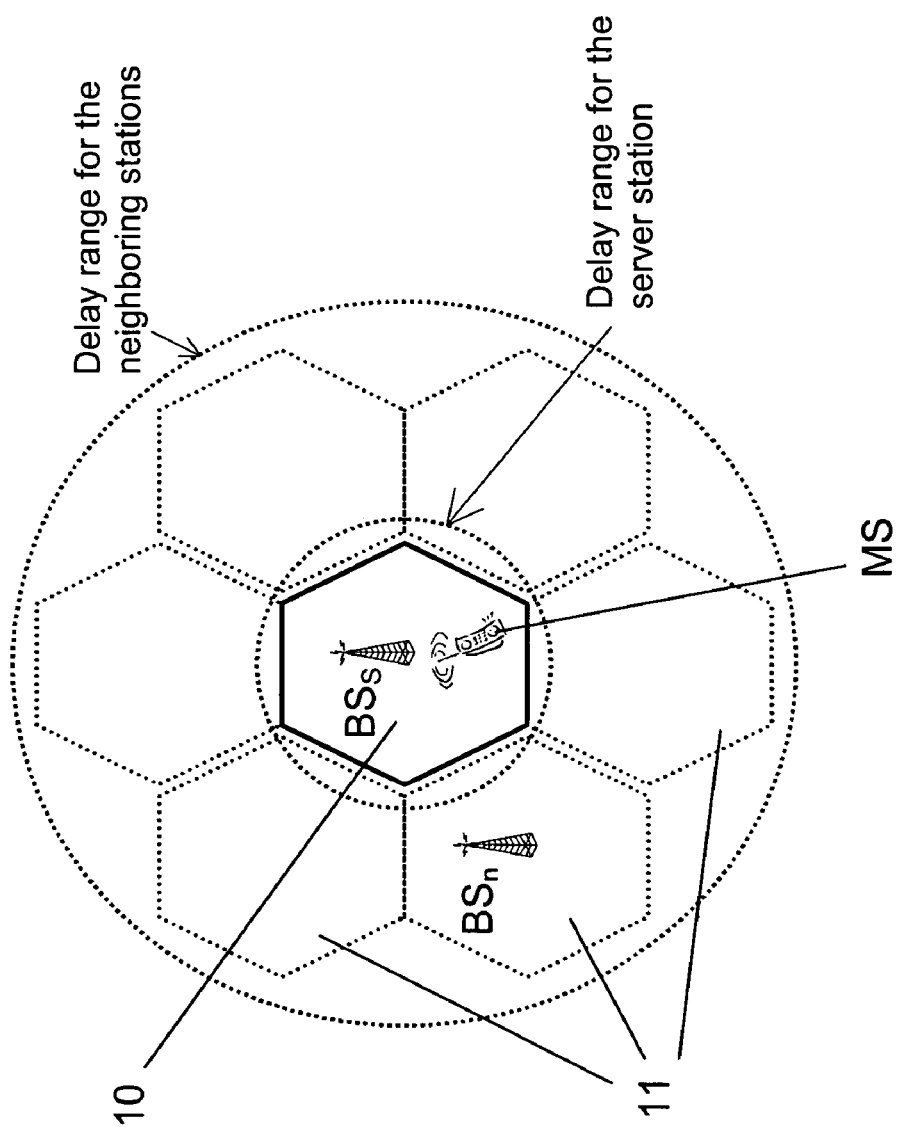
FIG. 1 shows a mobile station in a cellular communication system.

FIG. 1 has already been described above.

FIGS. 2 and 3a–3c illustrate by way of example the principle of the method according to the invention employed in a cellular communication system. The communication system comprises a mobile station and a cellular network with a plurality of cells, each of which is served by another base station. The communication system enables certain location services. Currently, the location of the mobile station is to be determined using these location services.

Figure 2:
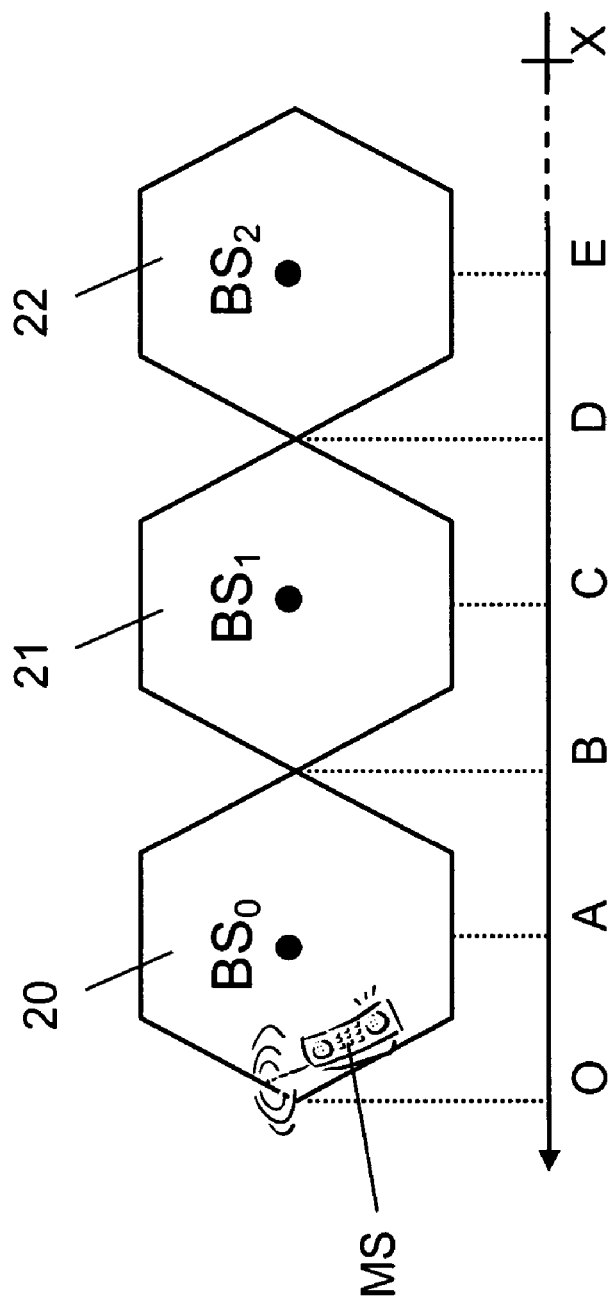
FIG. 2 indicates various distances in a cellular communication system.

FIG. 2 indicates various distances in the communication system. Several cells 20, 21, 22 of the cellular network are arranged in a row. A straight line depicted in parallel to this row associates different letters O, A to E, . . . , X to different locations in the communication system. Locations A to D are equidistant from the respective neighboring locations.

The mobile station MS is located in a server cell 20. The server cell 20 extends from location O to location B. A server base station $BS_0$ serving the server cell 20 is located in the center of this cell 20 at position A. A first neighboring cell 21 extends from location B to location D. A base station $BS_1$ serving cell 21 is located in the center of this cell 21 at position C. A second neighboring cell $BS_2$ begins at location D and extends beyond location E. A base station $BS_2$ serving cell 22 is located in the center of this cell 22 at position E. Further base stations may follow accordingly and extend at the most up to location X. The total length of the impulse response profile of signals transmitted by the base stations $BS_0$, $BS_1$, $BS_2$ covers the distance from location O to location X.

The mobile station MS now determines the distance to each of the base stations $BS_0$, $BS_1$, $BS_2$, in order to estimate its current location.

The server base station $BS_0$ is known, before the measurements for the location service start. The server base station $BS_0$ knows its own location and cell size and moreover the locations and the covering ranges of the other base stations $BS_1$, $BS_2$.

It is assumed that a communication is going on between the mobile station MS and the server base station $BS_0$. During this communication, the server base station $BS_0$ transmits the geometrical information and information on the cell size and covering ranges of the base stations to the mobile station MS. For cell size and covering ranges, e.g. an indication of the respective maximum distance from the base station to the border of the cell or the coverage area can be provided.

Based on the received information, the mobile station MS then determines a dedicated search window for each of the base stations $BS_0$, $BS_1$, $BS_2$ from which it might receive signals.

The resulting search windows are indicated in FIGS. 3a to 3c. Each of the figures shows a time line with the delay of the impulse response between 0 and |OX|. |OX| is a delay which a signal undergoes on a transmission path of the length from location O to location X.

For the server base station $BS_0$ itself, the searching range has to cover a circular area having a radius of the distance between locations O and A, since the mobile station MS is known to be located in the server cell 20. The mobile station MS thus determines a search window comprising a delay from zero to a delay |OA|, which is the propagation time required on a direct path over a distance from O to A. This search window for the server base station $BS_0$ is indicated in FIG. 3a. All components outside of this range in the impulse response can be excluded by the mobile station MS in the acquisition for the server base station $BS_0$.

Since the mobile station MS is located in the server cell 20, further the minimum distance between base station $BS_1$ and the mobile station MS is known to be the distance between locations B and C, and the maximum distance between base station $BS_1$ and the mobile station MS is known to be the distance between locations O and C. Thus, for base station $BS_1$, a search window is determined which covers corresponding delays |OA| to |OC|, where a delay |OA| is equal to a delay |BC|. This search window is indicated in FIG. 3b.

Since the mobile station MS is known to be located in the server cell 20, further the minimum distance between base station $BS_2$ and the mobile station MS is known to be the distance between locations B and E, and the maximum distance between base station $BS_2$ and the mobile station MS is known to be the distance between locations O and E. Thus, for base station $BS_2$, a search window is determined which covers corresponding delays |OC| to |OE|, where a delay |OC| is equal to delay |BE|. This search window is indicated in FIG. 3c.

The search window might be further limited by available information on the coverage range of the neighboring base stations $BS_1$, $BS_2$. For example, in case the mobile station MS was informed that the covering range of base station $BS_2$ has only a radius of A–E, the searching range could further be restricted from A to B, and the search window correspondingly to delays from |OC| to |OD|.

In the described example, the mobile station MS determines the search windows based on information received from the server base station $BS_0$. Alternatively, the server base station $BS_0$ could determine the search window for each of the base stations $BS_0$, $BS_1$, $BS_2$ and provide the mobile station MS only with information on these search windows.

In either case, the mobile station MS then estimates the delay of signals arriving from different base stations $BS_0$, $BS_1$, $BS_2$ by placing the determined search window in the impulse response profile of the received signals and by performing an edge detection within this search window. From the estimated delays, the mobile station MS calculates the respective distance to the base stations $BS_0$, $BS_1$, $BS_2$. The current location of the mobile station MS can be assumed to lie at the intersection point of circles around the base stations $BS_0$, $BS_1$, $BS_2$ with the respectively determined distance.

With the proposed method, the searching range is shortened, and thereby the false-alarm rate is reduced in the acquisition. When assuming cells of equal size, as in the example presented in FIGS. 2 and 3, the searching range is shortened by about one third for base station $BS_1$ and by about ⅗ for base station $BS_2$ compared to the conventional approach.

In practice, of course, the cell covering ranges are overlapping to each other and the cell sizes and shapes are not the identical. Nevertheless, the search window can be designed by the mobile station to cover all possible delays for acquiring a specified base station similarly as described above.

Figure 4:
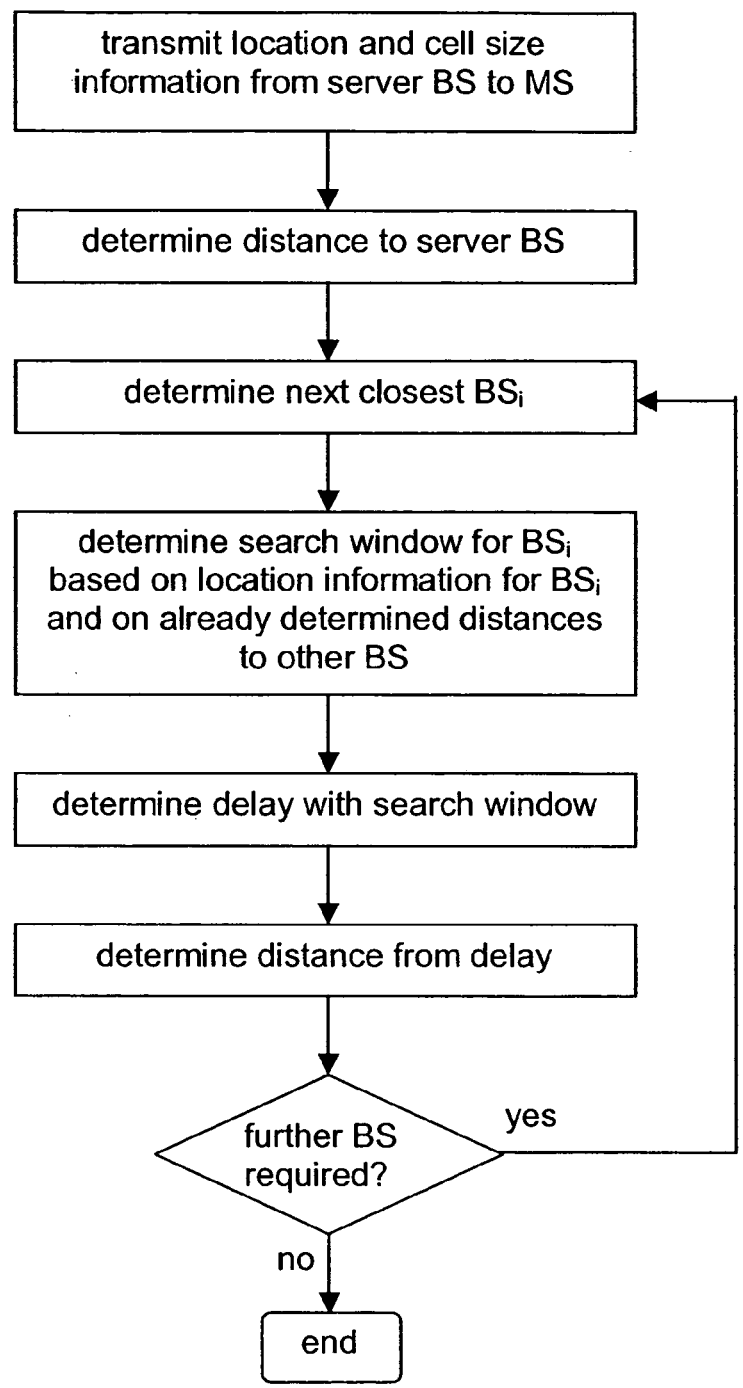
FIG. 4 is a flow chart illustrating an embodiment of the method according to the invention.

FIG. 4 is a flow chart illustrating an embodiment of the method according to the invention, which further shortens the searching range for acquiring neighboring base stations for a location service in a cellular communication system.

In a first step, a server base station $BS_0$ provides a mobile station MS with information on the location of the server base station $BS_0$ and of neighboring base stations $BS_i$ of the cellular network, with an indication of the maximum cell radius $R_0$ of the server base station $BS_0$, and with an indication of the covering ranges of the neighboring base stations $BS_i$.

Figure 5:
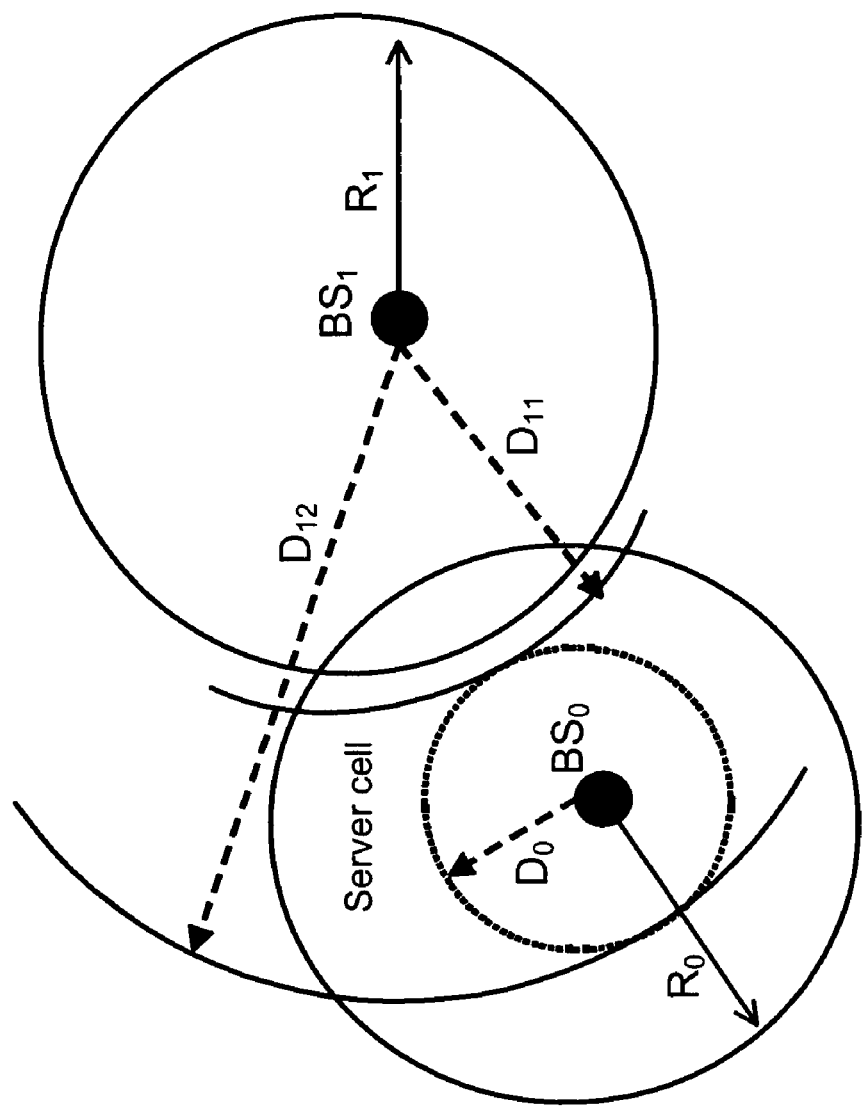
FIG. 5 illustrates the first steps in the flow chart of FIG. 4.

In a next step, the mobile station MS determines a search window for the server base station $BS_0$, as described above. The server base station $BS_0$ serves a cell having a maximum radius of about $R_0$. Thus, the determined search window has a size corresponding to a searching range of $R_0$. After acquiring the server base station $BS_0$, the mobile station MS then uses this search window for determining the delay of signals received from the server base station $BS_0$. The mobile station MS is able to calculate from this delay the distance $D_0$ to the server base station $BS_0$ at which the mobile station MS is currently located. FIG. 5 shows for illustration a cellular environment with server base station $BS_0$, radius $R_0$ and determined distance $D_0$.

For estimating the distance to further base stations $BS_i$, the mobile station MS combines the received geometrical information and information on already acquired base stations.

The mobile station MS first selects the closest neighboring base station $BS_1$. The neighboring base station $BS_1$ serves a cell with a maximum radius of about $R_1$, which cell is partly overlapping with the cell served by the server base station $BS_0$.

Figure 3:
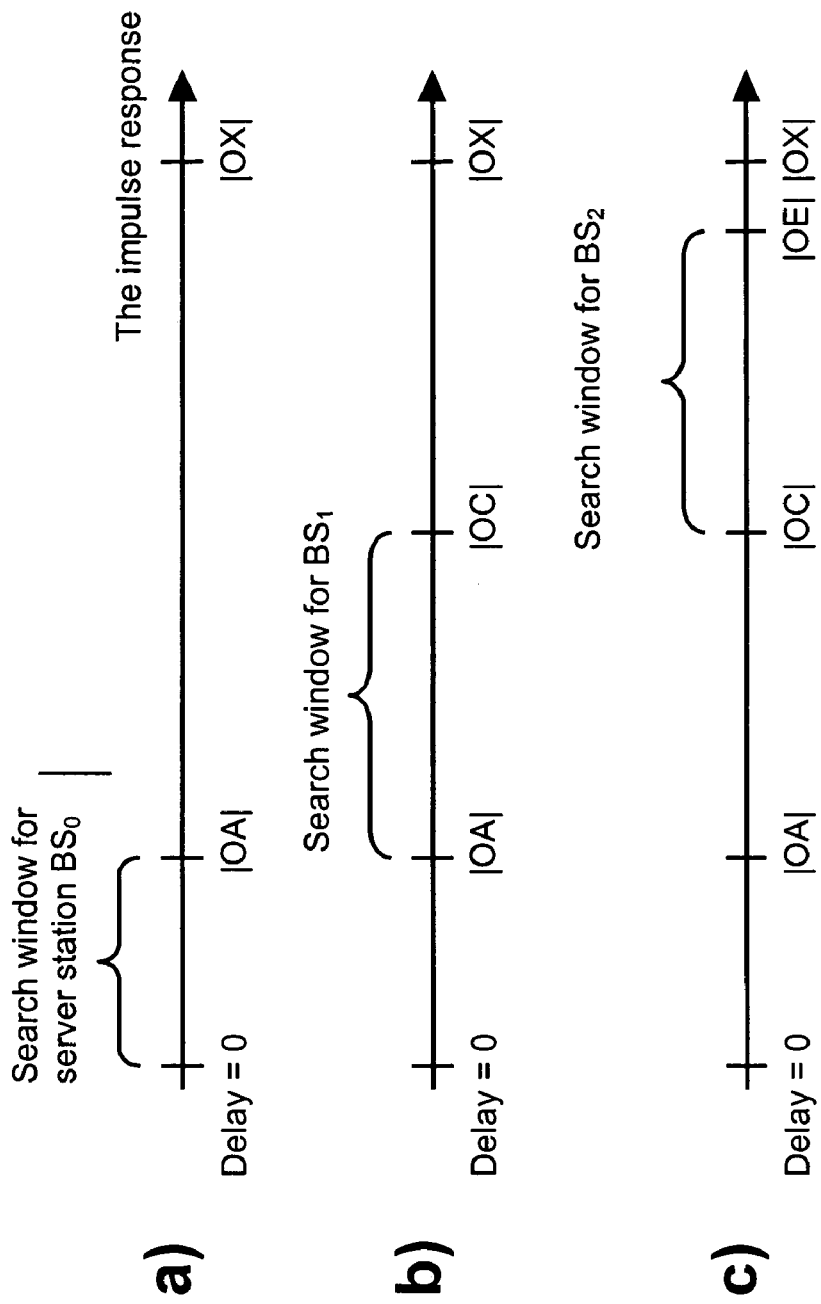
FIG. 3a)–c) illustrate in conjunction with FIG. 2 the principle of the method according to the invention.

In the example presented with reference to FIGS. 2 and 3, the searching range for base station $BS_1$ would now be about $2R_0$. The mobile station MS knows already, however, that it is located on a defined ring around the server base station $BS_0$, indicated in FIG. 5 with a dotted line. This ring has a distance of $D_0$ to the server base station $BS_0$. The searching range for base station $BS_1$ can thus be placed between $D_{11}$, which corresponds to the distance between base station $BS_1$ and the server base station $BS_0$ minus $D_0$, and $D_{12}$, which corresponds to the distance between neighboring base station $BS_1$ and the serving base station $BS_0$ plus $D_0$.

The length of the required searching range is therefore $2D_0$, which can be much smaller than the range of $2R_0$ used in the example of FIGS. 2 and 3a–c.

The mobile station MS acquires neighboring base station $BS_1$, uses the received search window for determining the delay of signals received by this base station $BS_1$, and from the delay the distance $D_1$ to base station $BS_1$.

As long as the distance to a further base station $BS_i$ is desired, the mobile station MS continues selecting the respective next closest neighboring station $BS_i$ and determines for it a search window based on the location information for this base station and on the already obtained location information for the mobile station MS.

For example, in the next itineration round, two base stations $BS_0$, $BS_1$ have already been acquired, and the distances $D_0$, $D_1$ of the mobile station MS to these base stations $BS_0$, $BS_1$ have been determined. The mobile station MS-thus has to be located on an intersection of two rings, one of which surrounds base station $BS_0$ with radius $D_0$ and the other one of which surrounds base station $BS_1$ with radius $D_1$. When searching for other base stations, this information can be used to limit the size of the search window to cover a very small searching range. The search window can be split in particular into two sub-windows to cover two small searching areas around the two intersection regions of the two rings. The indication of the covering range of the neighboring stations BSi can be used beforehand for checking whether the signals from a respective neighboring station BSi can reach the mobile station MS at all with a sufficient signal strength.

The more base stations that are acquired, the more accurate information on the location of the mobile station is obtained. The location information can be used in turn for acquiring additional base stations. The false-alarm rate can thereby be reduced to a minimum.

Figure 6:
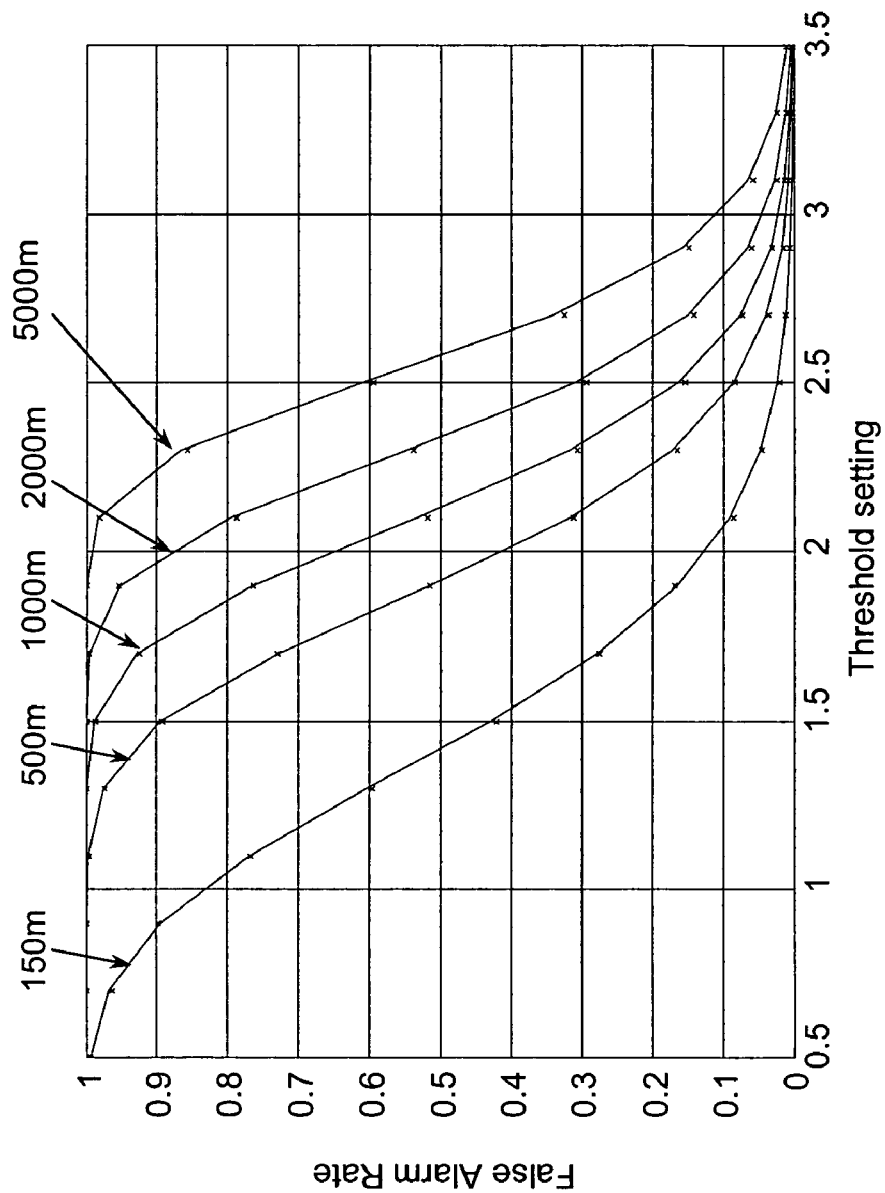
FIG. 6 is a diagram showing false alarm rate simulation results for different search window sizes.
Figure 7:
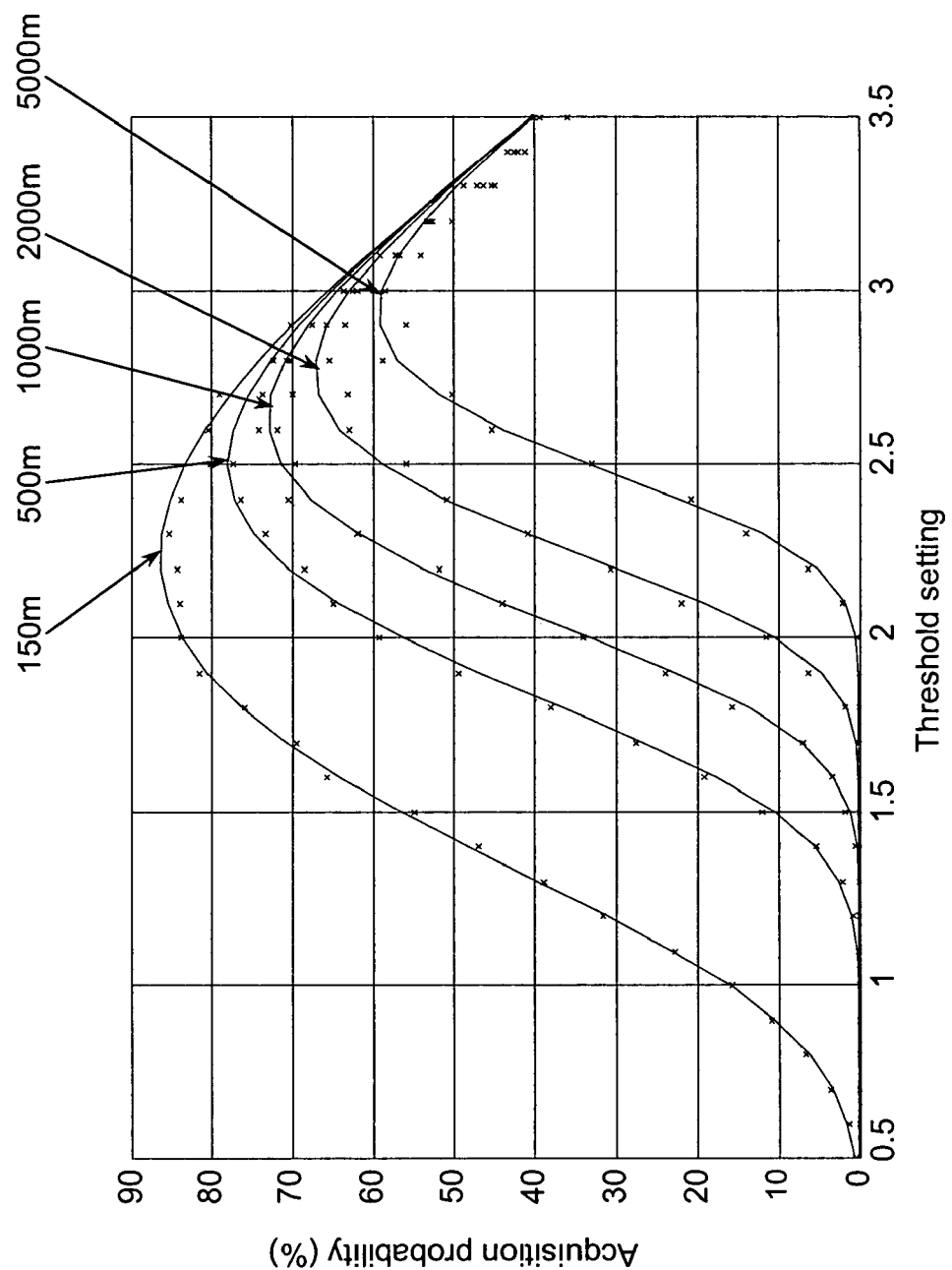
FIG. 7 is a diagram showing acquisition probability simulation results for different search window sizes.

FIGS. 6 and 7 are diagrams presenting simulation results which illustrate the improvements which can be achieved with the method according to the invention.

FIG. 6 depicts the false alarm rate over a set threshold for a searching range of 150 m, 500 m, 1000 m and 5000 m. The searching range corresponds directly to the size of the employed search window. A dedicated curve connects approximately the simulation results for each of the searching ranges. The threshold value indicates the strength a received signal has to have in order to be detected by the mobile station, and is indicated as a multiple of the noise mean with values from 0.5 to 3.5. The false alarm rate is the rate of those noise peaks which are wrongly detected to be a signal edge, since the threshold was set too low.

In a specific noise environment, the threshold is set according to a desired false alarm rate. It can be seen in FIG. 6 that the smaller the searching range, the lower the threshold value, which is required in order to achieve the same false alarm rate. For example, the false alarm rate may be required to be less than 0.2. If the searching range can be limited to 150 meters, the threshold setting should be set higher than about 1.8. If the searching range is 2000 meters, in contrast, the threshold should be set higher than 2.6. This means that the signal power has to be the higher for a larger searching range. Thus, more neighboring base stations can be considered in the location service with a smaller search window obtained in accordance with the invention.

FIG. 7 shows the acquisition probability in percent over a set threshold for a searching range of 150 m, 500 m, 1000 m and 5000 m. Again, a dedicated curve connects approximately the simulation results for each of the searching ranges. A signal-to-noise ratio of 9 dB is assumed. The acquisition probability takes into account on the one hand the probability that a correct signal is detected and on the other hand the probability that a detected signal is not a noise signal. Since both depend in an contrasting manner on the selected threshold value, the resulting curves have a maximum and indicate thus an optimum threshold value.

As can be seen in FIG. 7, the signal acquisition probability increases when the searching rage is reduced. For example, if the searching range is 150 meters, the maximum acquisition probability can reach about 85%, while if the searching range is 2000 meters, the maximum acquisition probability will only be about 67%. Thus, the benefit obtained by shortening the searching range is evident.

Figure 8:
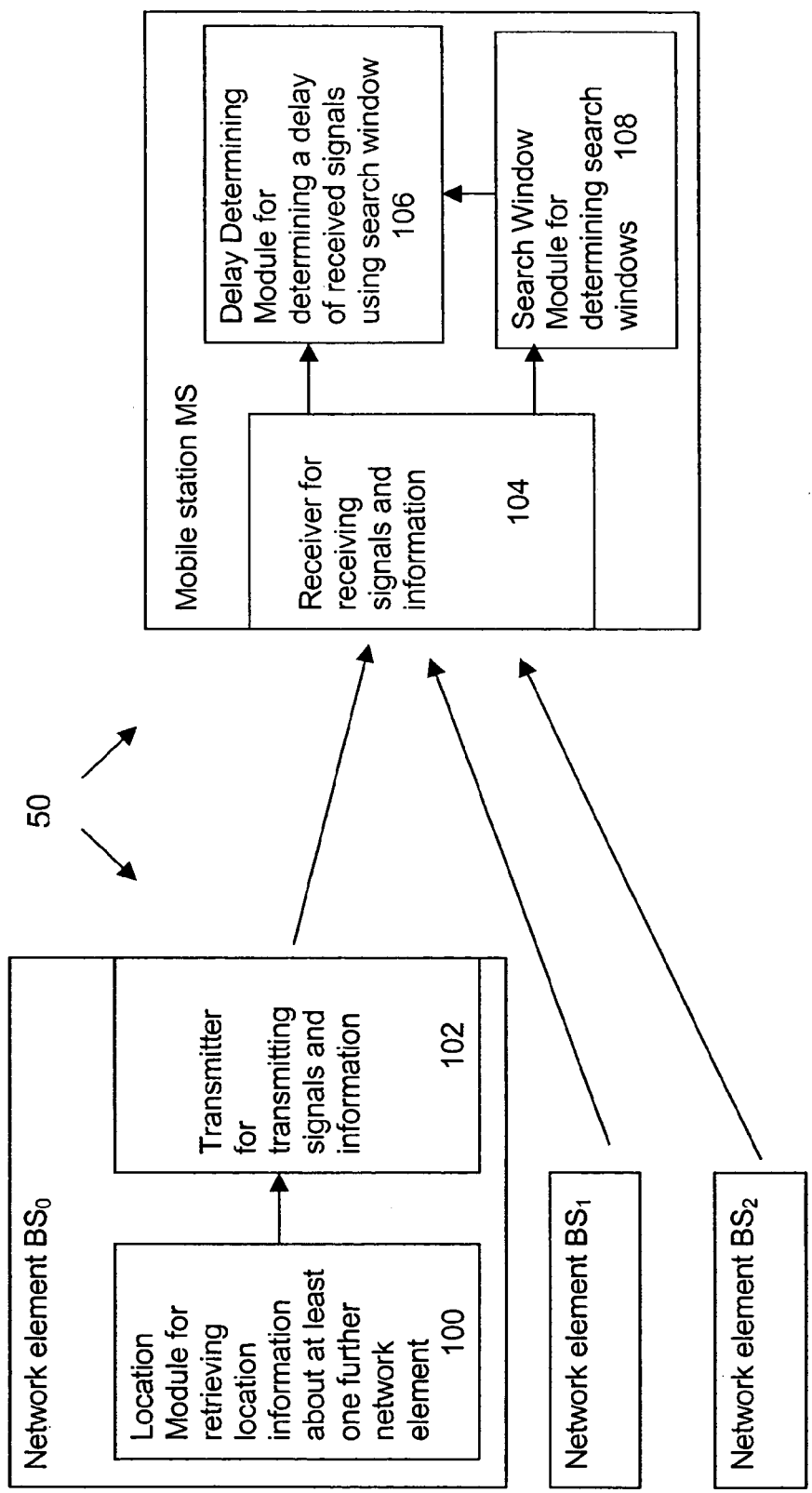
FIG. 8 is an overall block diagram of a communication system for implementing the method of the present invention.

FIG. 8 shows a communication system 50 in which the method described with reference to FIGS. 2 and 3 can be implemented.

The system comprises a mobile station MS of which the location is to be determined and also comprises a plurality of base stations $BS_0$, $BS_1$, $BS_2$ as network elements.

One of the base stations $BS_0$ comprises a location module 100 for retrieving available location information on other base stations $BS_1$, $BS_2$ and a transmitter 102 for transmitting the retrieved information to the mobile station. The information may comprise for example the geometrical information, information on the cell size and covering ranges of the base stations, mentioned with reference to FIG. 2. The other base stations each only have to comprise a regular transmitter for transmitting signals.

The mobile station comprises a receiver 104 for receiving signals and location information. Received location information is provided to a delay determining module 106 for determining a search window for each base station from which the mobile station might receive signals. The mobile station further comprises a search window module 108 for estimating the delay of signals arriving from different base stations using the determined search windows, as described with reference to FIG. 2.

Figure 9:
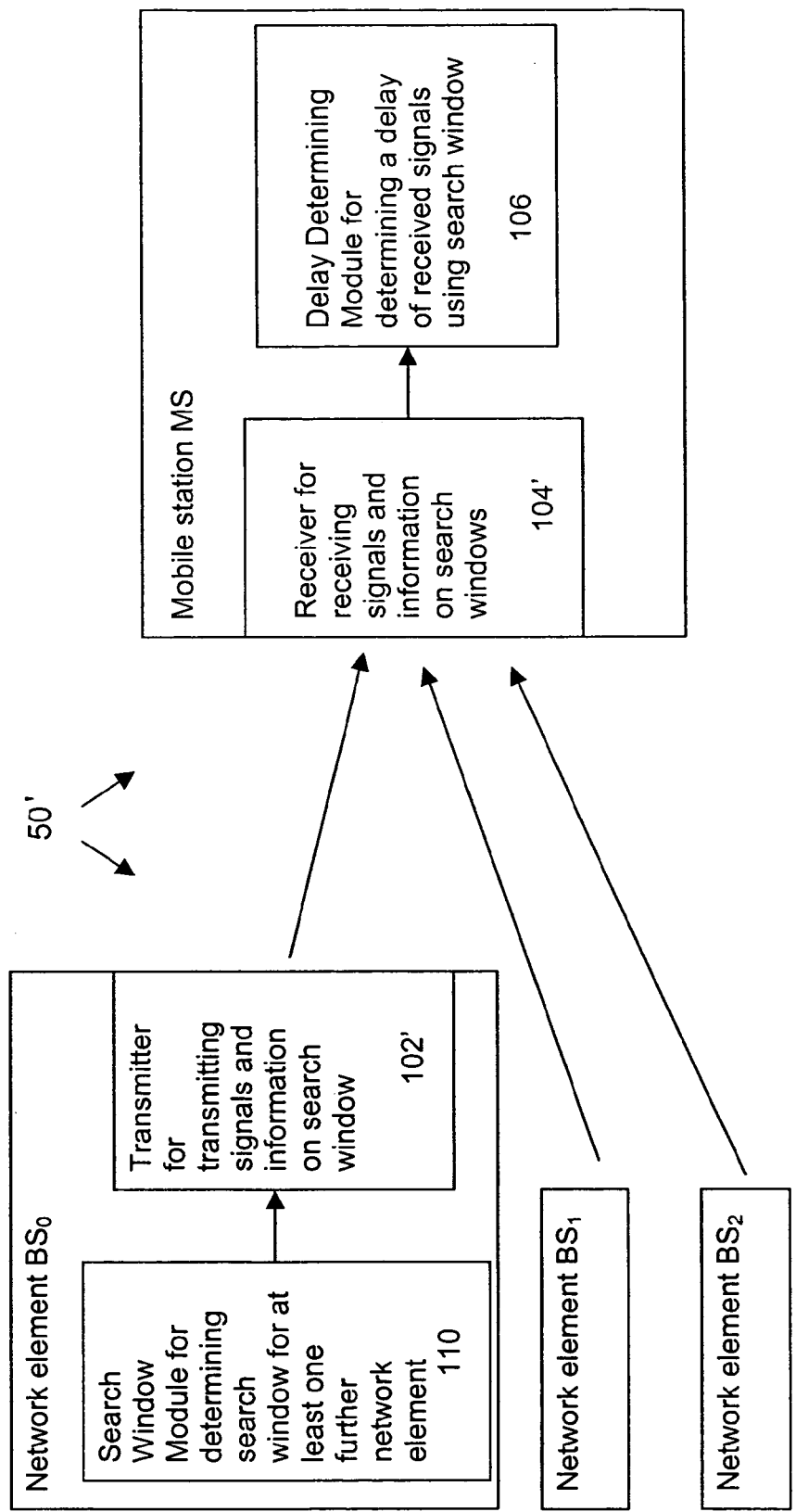
FIG. 9 is an overall block diagram of a modified communication system for implementing an alternative method of the present invention.

FIG. 9 shows a modified communication system 50' in which an alternative method, which was briefly mentioned as well with reference to FIG. 2, can be implemented.

The system comprises again a mobile station MS and a plurality of base stations $BS_0$, $BS_1$, $BS_2$ as network elements. In this case, however, one of the base stations $BS_0$ comprises a search window module 110 for determining a search window for each base station from which the mobile station might receive signals. The base station further comprises a transmitter 102' for transmitting signals and information on determined search windows to the mobile station. The other base stations each only have to comprise a regular transmitter for transmitting signals.

The mobile station comprises a receiver 104' for receiving signals and information on search windows. The mobile station further comprises a delay determining module 106 for estimating the delay of signals arriving from different base stations using the received information on a respective search window, as described with reference to FIG. 2.

It is to be noted that the described embodiments constitute only selected ones of a variety of possible embodiments of the invention.

The invention claimed is:

1. A method comprising:
   estimating a delay of a signal received at a mobile station from a specific network element of a network within a search window; and
   determining said search window based on location information available for said specific network element and based on a known distance of said mobile station to at least one other network element,
   wherein said at least one other network element comprises at least two network elements, to which a respective distance was already determined based on delay measurements on signals from said at least two network elements,
   wherein said search window is selected such that it covers intersection points of all circles around said at least two network elements with a radius of the respectively determined distance, and
   wherein said search window is used to determine the location of said mobile station.

2. A method according to claim 1, wherein said search window is subdivided into at least two sub-windows, each covering a respective intersection point.

3. A method according to claim 1, wherein a respective search window is determined for at least two specific network elements in the order of their distance to said mobile station, beginning with the network element which is the closest to said mobile station.

4. A method according to claim 1, wherein a search window is determined for at least two specific network elements in the order of the signal strength at said mobile station of signals transmitted by said network elements, beginning with the network element providing the strongest signal.

5. A method according to claim 1, wherein the covering range of said specific network element is taken into account in addition for limiting said search window.

6. A method according to claim 1, further comprising determining a threshold value based on the size of a determined search window, which threshold value defines the minimum signal strength of signals received at said mobile station for which a delay is estimated.

7. A method according to claim 1, wherein said at least one other network element comprises a serving network element serving a server cell in which said mobile station is currently located.

8. Apparatus comprising:
   means for receiving signals from a plurality of network elements of a network for determining the location of said mobile station and for receiving an indication of a size of a separate search window for each of said network elements; and
   means for determining a delay of the received signals for each of said network elements using a respective search window having said indicated size, wherein the indication of the size of said search window increases an acquisition probability for said received signals,
   wherein said search window is subdivided into at least two sub-windows, each covering a respective intersection point.

9. Apparatus comprising:
   a receiver configured to receive signals from a plurality of network elements of a network for determining the location of said mobile station and for receiving an indication of a size of a separate search window for each of said network elements; and
   a processor configured to determine a delay of the received signals for each of said network elements using a respective search window having said indicated size,
   wherein the indication of the size of said search window increases an acquisition probability for said received signals, and
   wherein said search window is subdivided into at least two sub-windows, each covering a respective intersection point.

* * * * *